United States Patent [19]

Gaertner

[11] Patent Number: 5,664,659
[45] Date of Patent: Sep. 9, 1997

[54] SUSPENSION TYPE CONVEYOR WITH A MATERIAL TRANSFER DEVICE

[76] Inventor: Franz Gaertner, Muehlweg 10, Unterelsbach, Germany, 97656

[21] Appl. No.: 343,495

[22] PCT Filed: May 27, 1993

[86] PCT No.: PCT/EP93/01333
§ 371 Date: Nov. 25, 1994
§ 102(e) Date: Nov. 25, 1994

[87] PCT Pub. No.: WO93/24398
PCT Pub. Date: Dec. 9, 1993

[30] Foreign Application Priority Data

May 27, 1992 [DE] Germany ............ 92 07 217.8

[51] Int. Cl.⁶ .................................. B65G 47/36
[52] U.S. Cl. .............. 198/360; 198/465.4; 198/680; 198/687.1
[58] Field of Search ............... 198/360, 465.4, 198/680, 687.1

[56] References Cited

U.S. PATENT DOCUMENTS

| 2,609,083 | 9/1952 | Leach | 198/465.4 |
|---|---|---|---|
| 3,124,236 | 3/1964 | Gerisch | 198/360 |
| 3,194,383 | 7/1965 | Kuwertz | 198/465.4 X |
| 3,247,952 | 4/1966 | Kozlasky | 198/360 |
| 3,343,648 | 9/1967 | Rakel | 198/360 |
| 3,403,767 | 10/1968 | Gerisch | 198/360 |
| 3,454,148 | 7/1969 | Harrison | 198/360 X |
| 3,499,518 | 3/1970 | Goodpoaster | 198/360 X |
| 5,125,513 | 6/1992 | Branch | 198/360 X |
| 5,232,078 | 8/1993 | Kuhlmann et al. | 198/360 |

FOREIGN PATENT DOCUMENTS 2419639  1/1975  Germany ............ 198/465.4

Primary Examiner—David A. Bocci
Attorney, Agent, or Firm—Jones & Askew, LLP

[57] ABSTRACT

Suspension conveyor for transporting suspended material which hangs on a hook, such as garments on coat hangers, with trolleys suspended on a rail. The conveyor has carrying rods on which the hooks are suspended, with at least one descending discharging rod by which the material slides off under gravity. A transfer finger, arranged at the upper end of the discharging rod, and movable against the carrying rod of a trolley in a transfer position to engage underneath the hook, has an ascending ramp section to release the hooks which move over the ascending ramp section. A retaining device keeps the garments away from the transfer position on the trolley carrying rods until the finger is pivoted into the material transfer position.

16 Claims, 6 Drawing Sheets

Fig_2

Fig_3

Fig_4

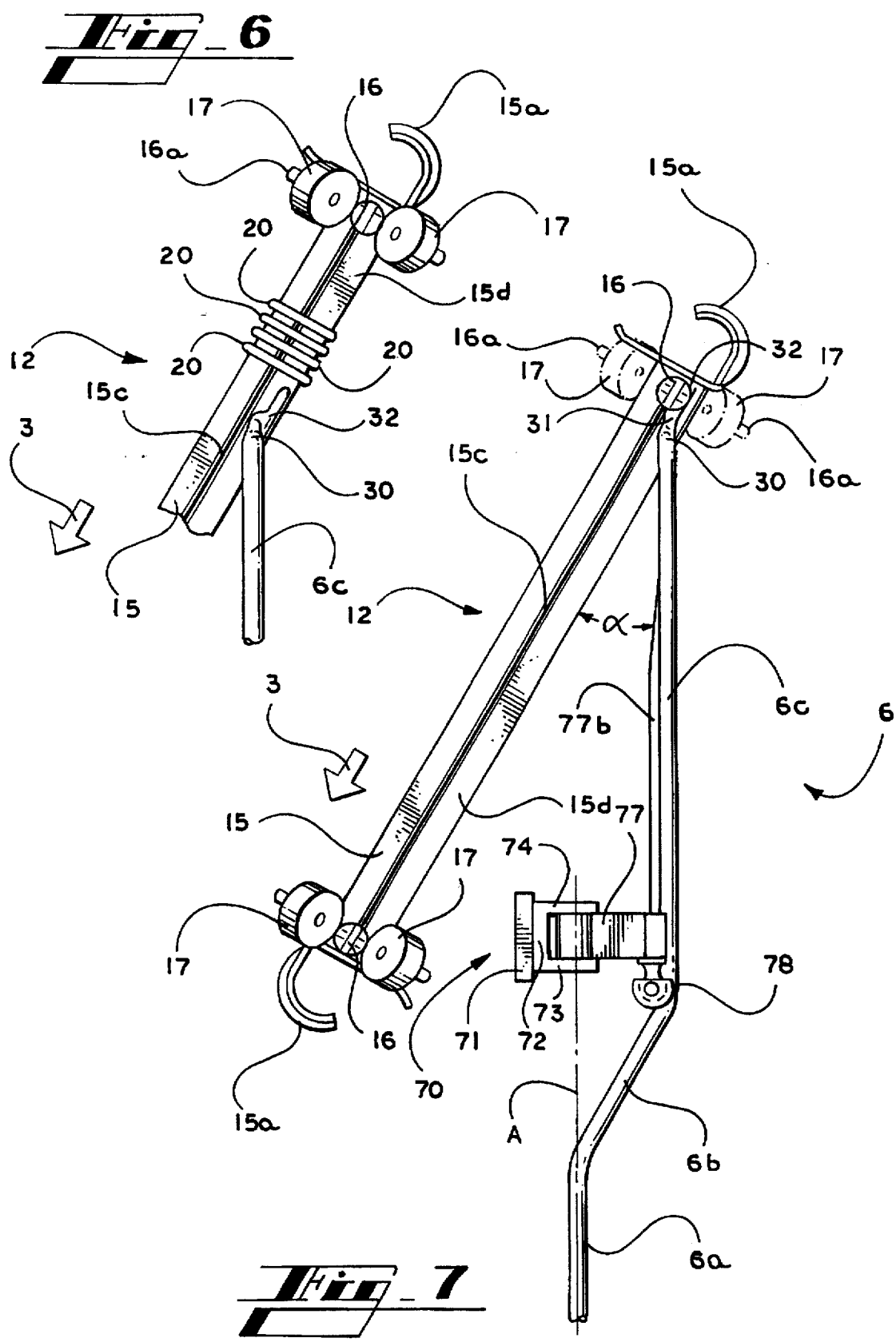

SUSPENSION TYPE CONVEYOR WITH A MATERIAL TRANSFER DEVICE

BACKGROUND OF THE INVENTION

The invention pertains to a suspension type conveyor for transporting material which hangs on a hook in a suspended fashion, in particular garments which hang on coat hangers, with trolleys that are suspended on a rail, transport the material along this rail and are provided with carrying rods on which the hooks are suspended, with at least one descending discharging rod which borders with its upper end laterally on the moving path of the trolley carrying rods and by which means the material slides off under the influence of gravity, and with a transfer device for transferring the material transported by the trolleys, whereby said transport device comprises a transfer finger which is arranged at the upper end of the discharging rod, may be moved against the carrying rod of the respective trolley situated in a transfer position such that it engages underneath the hook and is provided with an ascending ramp section in such a way that the hooks which move over said ascending ramp section are released from the carrying rods.

Such suspension type conveyor serves for transferring garments onto a discharging rod at certain locations. Here, the transfer from the rail and/or distribution track to the corresponding discharging rods is carried out by means of a transfer device. The material slides on the discharging rods which have a descending section to another rod section situated at a lower elevation which, for example, may be a collection point, or the material is conveyed additionally to a different distribution track.

The transport of the material suspended on the hooks is carried out by means of trolleys, the carrying rods of which are designed for accommodating a row of, for example, garments which are hanging on coat hangers, whereby the discharging rods with their transfer devices cooperate with the carrying rods of the trolleys in such a way that the material may be transferred without obstructions.

A suspension type conveyor of the type mentioned initially is disclosed in German Patent No. DE 3,807,280 C1. In this known conveyor, the finger of the transport device is constructed in one piece with the carrying rod, namely as a linear extension of it. In addition, the transfer device comprises a towing conveyor which may be displaced parallel to the finger, takes hold of the hooks of the coat hangers arriving on the tip of the finger due to the continuous transport movement of the trolleys, and transfers these hooks to the descending section of the discharging rod via the ascending ramp section of the finger. The finger of the transfer device of this conveyor always is situated directly adjacent to the moving path of the trolley carrying rods, so that this particular transfer device may only be utilized for special trolleys, the ends of which are not equipped with any laterally projecting connecting devices, e.g., coupling components.

One development of this known suspension type conveyor is described in German Patent No. DE 3,934,995 C1. According to this publication, the transfer conveyor cooperates with the finger and may be pivoted laterally out of the moving path of the trolley carrying rods together with the discharging rod and the finger which is rigidly connected to it, so that it is also possible to utilize trolleys, the ends of which are equipped with laterally protruding coupling components.

The transfer devices in both of the suspension type conveyors described previously are constructed in a very complicated fashion and/or are limited to certain types of trolleys and are only suitable for relatively slow transport speeds.

The present invention is based on the objective of creating a suspension type conveyor of the type mentioned initially, the transfer device of which is designed in a very simple fashion and ensures a transfer which is adapted to an increased conveying capacity without obstructions.

SUMMARY OF THE INVENTION

According to the invention, the transfer device is constructed as a connecting piece of the inclining discharging rod and situated on the side of the trolley rods. The connecting piece is arranged such that it may be rotated around the longitudinal axis of the discharging rod, and one side of said connecting part is provided with a curved finger. The finger may be adjusted between a position in which it adjoins the trolley rod and a position in which it is situated laterally next to the trolley rod by rotating the connecting piece. The curvature of the finger is chosen in such a way that the tip of the finger lies underneath the apex of the finger curvature if the finger adjoins the trolley rod. The continuously affected movement of the trolleys presses the hooks over the finger curvature, so that the hooks are stripped from the trolley rod and slide over the carrying rod except for the last hook(s). The last hook(s) are lifted off the trolley carrying rod due to the fact that the tip of the finger is moved into a position above the apex of the finger curvature by pivoting the connecting part, so that these last hooks are securely removed from the trolley, whereby the finger is pivoted out of the region of the laterally projecting elements of the trolleys.

The transfer device according to the invention is characterized by a simple design. One essential factor for an undelayed and undisturbed operation of the continuously moving trolleys is that the transfer device may be simply and very rapidly stitched between its two positions, namely the material removal position and the standby position, by being rotated around the longitudinal axis of the discharging rod, such that the transfer process does not impair the continuous transport movement of the suspension type conveyor.

BRIEF DESCRIPTION OF THE DRAWING

Examples of the invention am described in detail below with the aid of the figures. The figures show:

FIG. 6: a top view of the finger of the transfer device according to the invention which is situated on the carrying rod of the trolley so as to take hold of the hooks on which the material is suspended, and FIG. 7: a top view of the trolley and the transfer device in a position in which the finger of the transfer device engages laterally behind a trolley suspension device with the tip of the finger.

DESCRIPTION OF PREFERRED EMBODIMENTS

Figure 1:
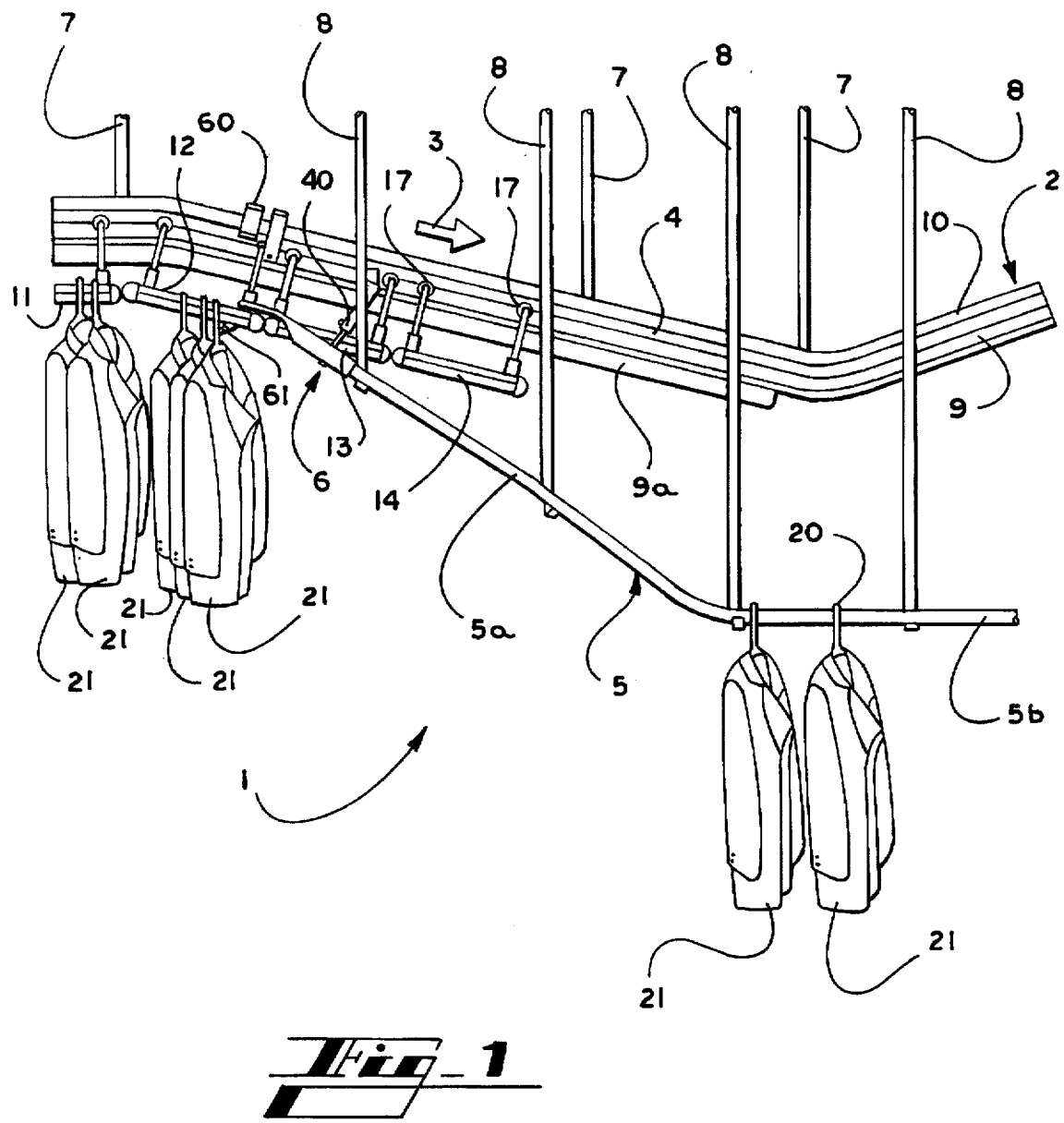
FIG. 1: a side view of the inclining section of the suspension type conveyor according to the invention.
Figure 2:
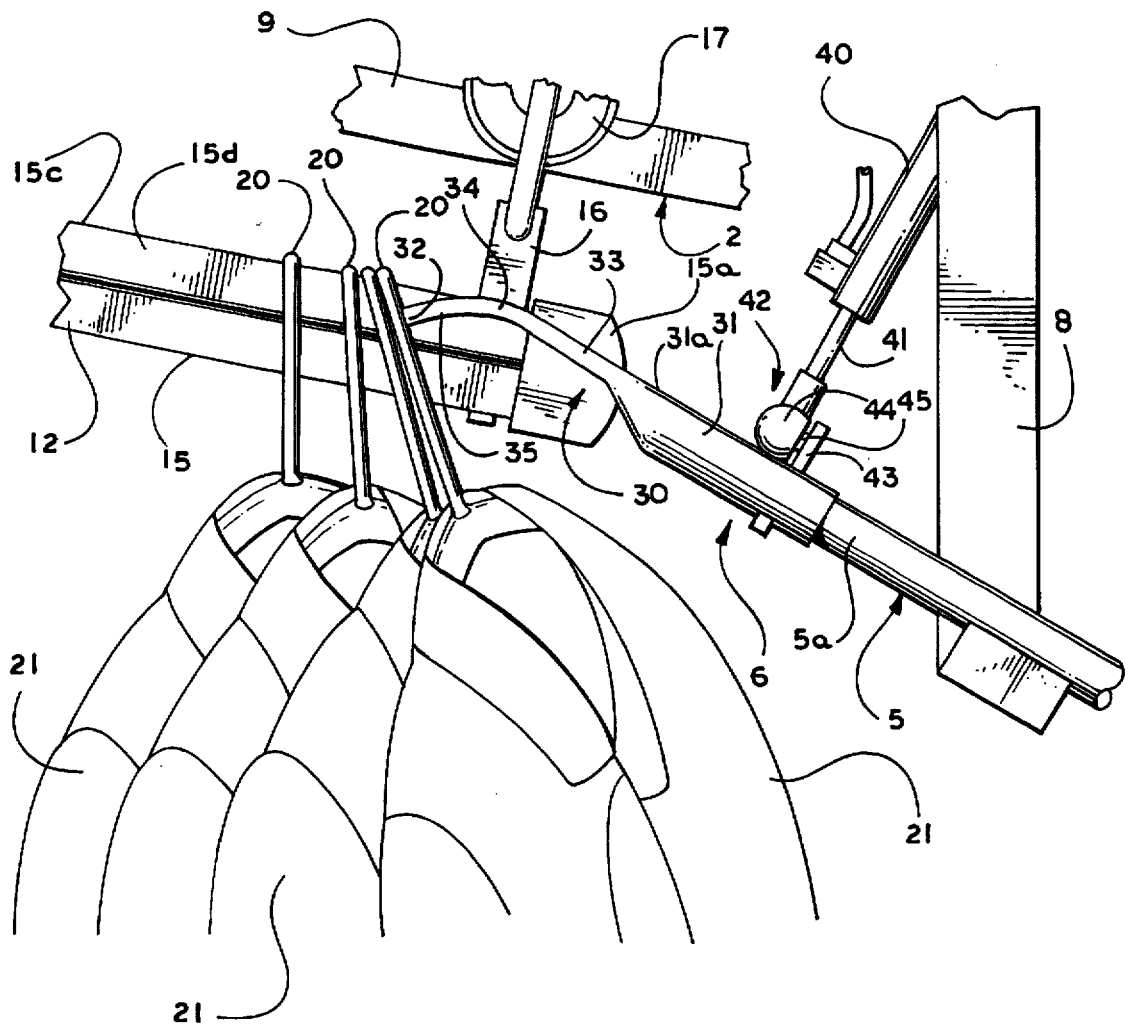
FIG. 2: a detail of the suspension type conveyor illustrated in FIG. 1 in the region of its transfer device.
Figure 3:
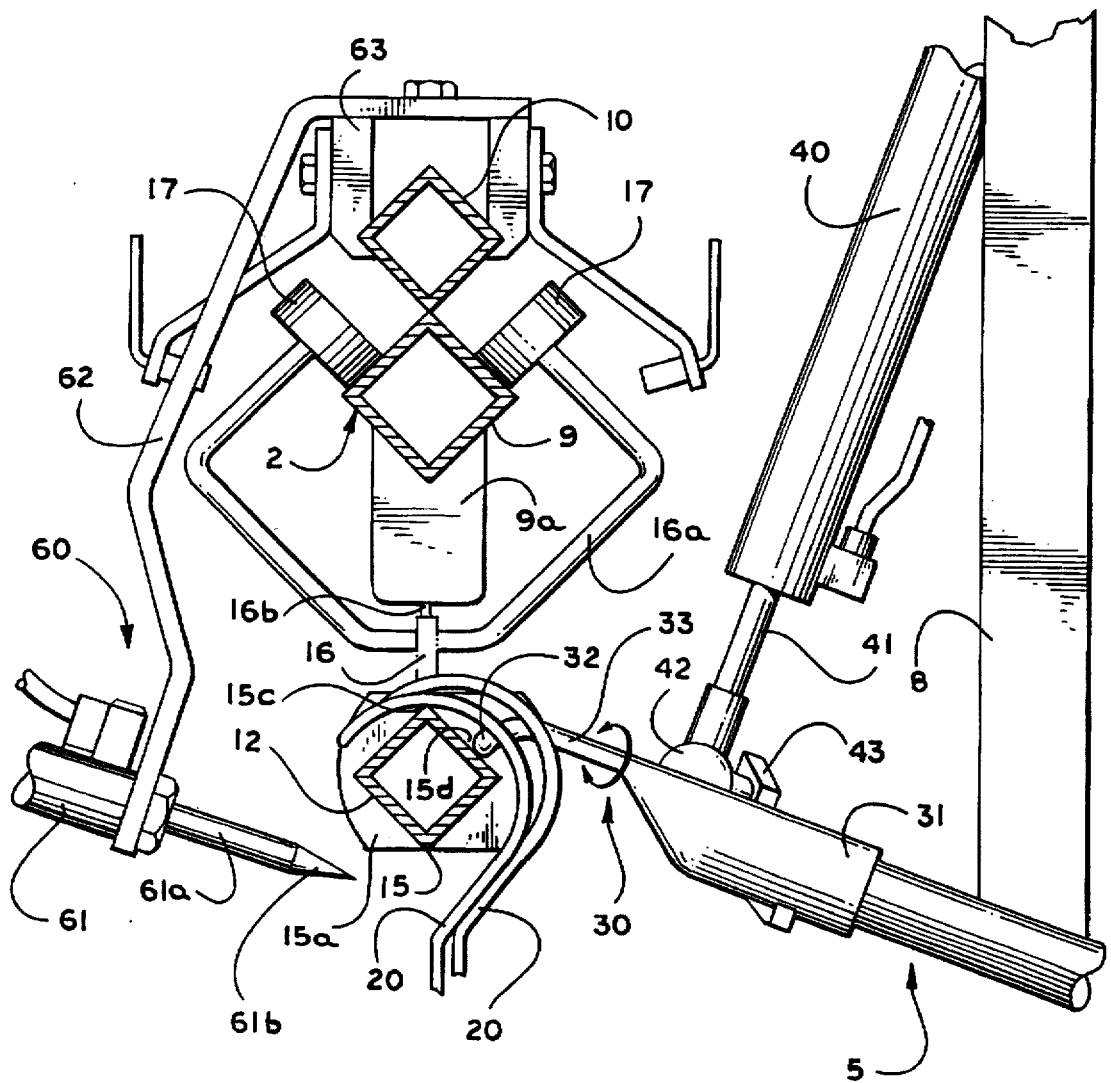
FIG. 3: a view of the detail illustrated in FIG. 2 viewed in the conveying direction of the distribution track.

A first embodiment of the suspension type conveyor according to the invention is illustrated in FIGS. 1 through 3.

The suspension type conveyor 1 has an inclining section 4 for transporting the material suspended on hooks in the direction of the arrow 3. However, an inclining section is not absolutely required. The device comprises a distribution track 2 which is constructed as a profiled rail. The distribution track 2 consists of two hollow rails 9 and 10 which have a square cross-sectional shape, are arranged on top of each other and lie on their edges. The lower edge of the upper rail 10 is connected to the upper edge of the lower rail 9, preferably by welding. The distribution track 2 is suspended on a carrying device which comprises band-shaped carriers 7 which, for example, are connected rigidly with the upper rail 10 of the distribution track 2 and the sealing of a room.

The distribution track 2 forms the transport path for the trolleys 11–14. In the embodiment shown in the figures, all trolleys 11–14 are constructed identically. Each trolley 11–14 comprises a carrying rod 15. The rod 15 is a hollow tube with a square cross-sectional shape and may, for example, consist of aluminum. Both ends of the carrying rod 15 are covered by caps 15a which form coupling elements by which trolleys which come in direct contact with each other are coupled as shown in FIG. 1. In addition, each trolley 11–14 comprises suspension means by which the carrying rods 15 are suspended on the rail 9 of the distribution track 2. These suspension means comprise, e.g., two spiral springs 16 per trolley which are connected rigidly with the trolley carrying rod 15 within the region of the caps 15a. These two springs 16 extend perpendicular to the longitudinal axis of the carrying rod 15 and are connected to it within the region of the lower edge of the rod 15 that lies on its edge. The upper end of each spring 16 is connected to a bar 16a which is aligned such that it lies in a plane which extends perpendicular to the longitudinal extent of the rail 9. The bar 16a has upper, free bar ends on which rollers 17 are arranged such that they may rotate around these bar ends. The rollers 17 are engaged with the two upper side surfaces of the carrying rail 9 which extend in the shape of a roof and consequently ensure the rolling transport of the trolleys 11–14 on the rail 9 of the distribution track 2. The rolling transport is affected by an endless revolving chain which is driven and arranged in a housing 9a that is fastened onto the lower side of the rail 9. The transport chain is guided in a positive fashion and runs parallel to the rails 9,10 in the housing 9a, whereby a pin 16b which is fastened onto the upper end of the spiral spring 16 engages into the apertures of the chain through a slot in the housing. One example of a suspension type conveyor of this type is described in German Patent No. DE 3,510,955 A1.

The trolleys form the transport means for the material which is suspended on the hooks and transported by means of the suspension type conveyor 1. The material to be transported in the figures are garments, namely jackets 21, whereby each trolley 11–14 preferably is capable of carrying several such jackets. The garments 21 are suspended on the carrying rods 15 of the trolleys 11,12 by means of coat hangers which have conventional hooks 20 that are suspended on the upper longitudinal edge 15c of the trolley rod 15 as shown in FIG. 3.

The known suspension type conveyor 1 is combined with a transfer device by means of which the garments 21 may be removed from the trolleys 11–14 and transported away. This device comprises a preferably cylindrical discharging rod 5 which is suspended on the support construction of the suspension type conveyor 1 via band-shaped carriers 8. The carriers 8 are arranged essentially at identical distances along the discharging rod 5 and laterally connected rigidly with said discharging rod in such a way that the hooks 20 may slide on the upper side of the rod 5 without being obstructed. The discharging rod 5 is, for example, arranged at the inclining section 4 of the distribution track 2 and comprises a descending section 5a which is situated on the side of the distribution track and transforms into a horizontally extending section 5b at its lower end.

The transfer device 6 according to the invention is arranged at that side of the section 5a of the discharging rod 5 which is situated in the vicinity of the distribution track. This transfer device serves for removing garments 21 from, for example, the trolley 12 situated at the elevation of the transfer device 6 in a controlled fashion and for transferring said garments to the discharging rod 5.

According to the invention, the transfer device 6 is constructed as an extension of the discharging rod 5. This extension has a cylindrical, sleeve-shaped connecting part 31 which may be rotated around the longitudinal axis of the discharging rod end 5a and arranged on the end 5a of the discharging rod 5 situated at the distribution track side in a fashion not shown in detail in the figures. Roller bearings and/or ball bearings which are arranged between the inner wall of the sleeve 31 and the outer wall of the discharging rod end section may be considered for arranging the connecting part in a rotatable fashion. The transfer device 6 is provided with a finger 30 which is constructed in one piece with the sleeve 31 and situated in an extension of the top surface 31a of the sleeve 31 extending in the direction of the distribution track 2 and/or the trolleys 12 situated thereon. Adjacent to the sleeve 31, the finger has a linear finger section 33 which extends along the upper surface 31a of the aforementioned sleeve as well as a rounded finger tip 32. The finger 30 extends in a bent and/or curved fashion between the finger tip 32 and the linear finger section. The purpose of the finger curvature 34 will be explained later in this text. The finger tip 32 is situated laterally next to the rotation axis of the sleeve 31 and is consequently pivoted eccentrically when rotating the sleeve 31.

A piston/cylinder arrangement 40 which preferably operates in a hydraulic fashion is provided for rotating the transfer device 6. The piston/cylinder arrangement 40 is arranged perpendicular to the discharging rod 5 between this discharging rod and the distribution track 2 and connected in an articulated fashion with the sleeve 31 at the end situated at the side of the discharging rod. A piston rod 41 of the arrangement 40 is connected to the sleeve 31 via a ball joint 42. The ball joint 42 consists of a hollow spherical cap 44 which is connected rigidly with the piston rod 41 and a ball which is arranged positively in the spherical cap 44 and connected rigidly with a shaft 45 which in turn is connected with a plate-shaped flange 43 that projects laterally from the sleeve 31, lies in one radial plane with it and is connected rigidly with said sleeve. The forward and backward movement of the piston rod 41 during the actuation of the piston/cylinder arrangement 40 transforms the linear back and forth movement of the piston rod 41 into a rotation of the sleeve 31 around its central longitudinal axis and/or the central longitudinal axis of the discharging rod 5 via the ball joint 42 and the flange 43.

The sleeve 31 of the transfer device 6 may be rotated between two final positions, namely between one position in which the tip 32 of the finger 30 is situated at a lateral distance from the carrying rod 15 of the trolley 12 arranged on the transfer device 6 (FIG. 1) and a material transfer position in which the finger tip 32 is situated at the upper lateral surface 15b of the carrying rod 15 which opposes the finger tip (FIGS. 2,3). In the latter position, the curved finger section 34 extends in such a way that the finger section 35 situated between the finger tip 32 and the apex of the curvature section 34 forms an inclining contact surface for the coat hangers 20 constructed like a ramp and leading away from the carrying rod 15. Here, the finger tip 32 is situated underneath the apex of the curvature of the finger 30. The ramp section 15 extends at a lateral angle to the surface 15d of the carrying rod 15 in such a way that a coat hanger 20 that is moved over the finger tip 32 onto the finger 30 due to the transport movement of the carrying rod 15 in the direction of the arrow 3 and the influence of ensuing hooks (FIG. 2) is lifted until the free end of the hook 20 slides over the upper longitudinal edge 15c of the carrying rod 15. Since the finger 30 and consequently the ramp section 35 in addition extends at a lateral angle to the carrying rod surface 15d, the hook is not only lifted but also pulled away laterally from the carrying rod 15 as shown in FIG. 3, so that the hook is entirely released from the carrying rod 15 and pushed over the apex of the finger curvature onto the descending finger section 33 by means of the ensuing hooks, and the hook slides from the descending finger section onto the discharging rod 5 via the sleeve 31. The ensuing hooks are lifted by the finger 30 in the same fashion as described previously, whereby no pressure pushing the last hook, in particular, the last hook viewed in the transport direction of the trolley, is present so as to push this last hook over the ramp of the finger curvature. These last hooks are lifted from the carrying rod by pivoting the finger 30 into its position where it is situated far from the carrying rod. This is carried out by pivoting the finger tip 32 upward over the apex of the finger curvature 34. This measure facilitates that the last hook 20 is also lifted upward over the upper longitudinal edge 15c of the carrying rod 15 as well as stripped from the carrying rod 15 laterally such that it may continue to slide downward automatically. As soon as the pivoted final position of the finger 30 has been reached, the finger tip 32 lies above the apex of the finger curvature 34, so that all garments 21 which are carried by the finger 30 via the respective coat hangers 20 may slide to the connecting part 31 of the transfer device 6 and subsequently onto the discharging rod 5 under the influence of gravity. While the garments 21 slide downward on the discharging rod 5, the unloaded trolley 12 is transferred into the position of the trolley 13 illustrated in FIG. 1, and the next trolley 11 has assumed the unloading position relative to the transfer device 6. The coupled trolley train comprising the trolleys 11,12,13,14 is transported continuously, whereby the transfer is carried out in a correspondingly continuous fashion.

The suspension type conveyor 1 according to the invention additionally comprises a material storage device 60 straddling the upper rail 10 of the distribution track 2 and possibly fixed thereon. The storage device 60 comprises a sled 63 that straddles the upper distribution rail 10 and is fastened onto the carrying arm 62, which extends laterally downward and engages laterally behind the suspension means 16,17 for the trolleys 11–14 at a distance. At the lower end of the carrying arm 62 a piston/cylinder arrangement 61 is fastened, which preferably operates in a hydraulic fashion. The piston rod 61a of the piston/cylinder arrangement 61 is constructed in the shape of a tip 61b at the free end and extends perpendicular to the distribution track 2 and consequently perpendicular to the carrying rods 15 of the trolleys 11–14. The piston rod 61a is arranged in such a way that it does not obstruct the movement of the trolleys, even in the extended position. For this purpose, the piston rod 61a lies underneath the lower longitudinal edge of the carrying rod of the trolley 12 situated in the transfer position.

FIG. 3 shows the retracted position of the piston rod 61a in which the tip 61b of the piston rod 61a is situated at a lateral distance from the ends of the coat hangers 20 situated at the side of the bars. The actuation of the piston/cylinder arrangement allows the piston rod 61a to be moved forward to such an extent that it reaches into the region of the hook cross pieces on the bar side and thus retains the hook 20 situated at the elevation of the tip 61b as well as the ensuing coat hangers during the transport of the trolleys.

One additional embodiment of the transfer device according to the invention as well as the trolleys arranged at said transfer device is illustrated in FIGS. 4–7. This transfer device also may be a component of the suspension type conveyor illustrated in FIGS. 1–3. Identical reference symbols were used as far as this transfer device and trolley correspond with the transfer device and trolley according to FIGS. 1–3.

Figure 4:
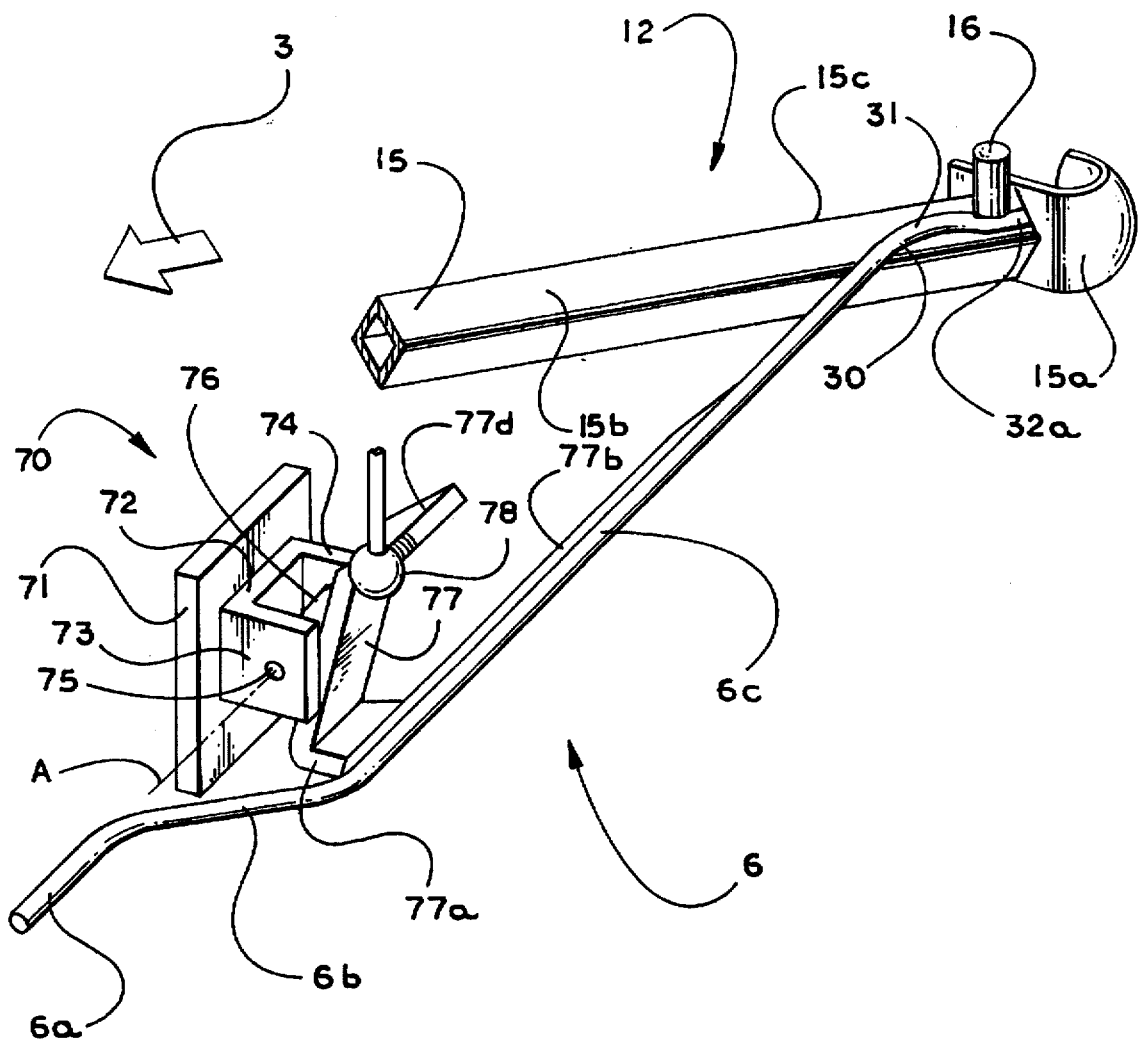
FIG. 4: a side view of a different embodiment of the transfer device according to the invention in its material removal position.
Figure 5:
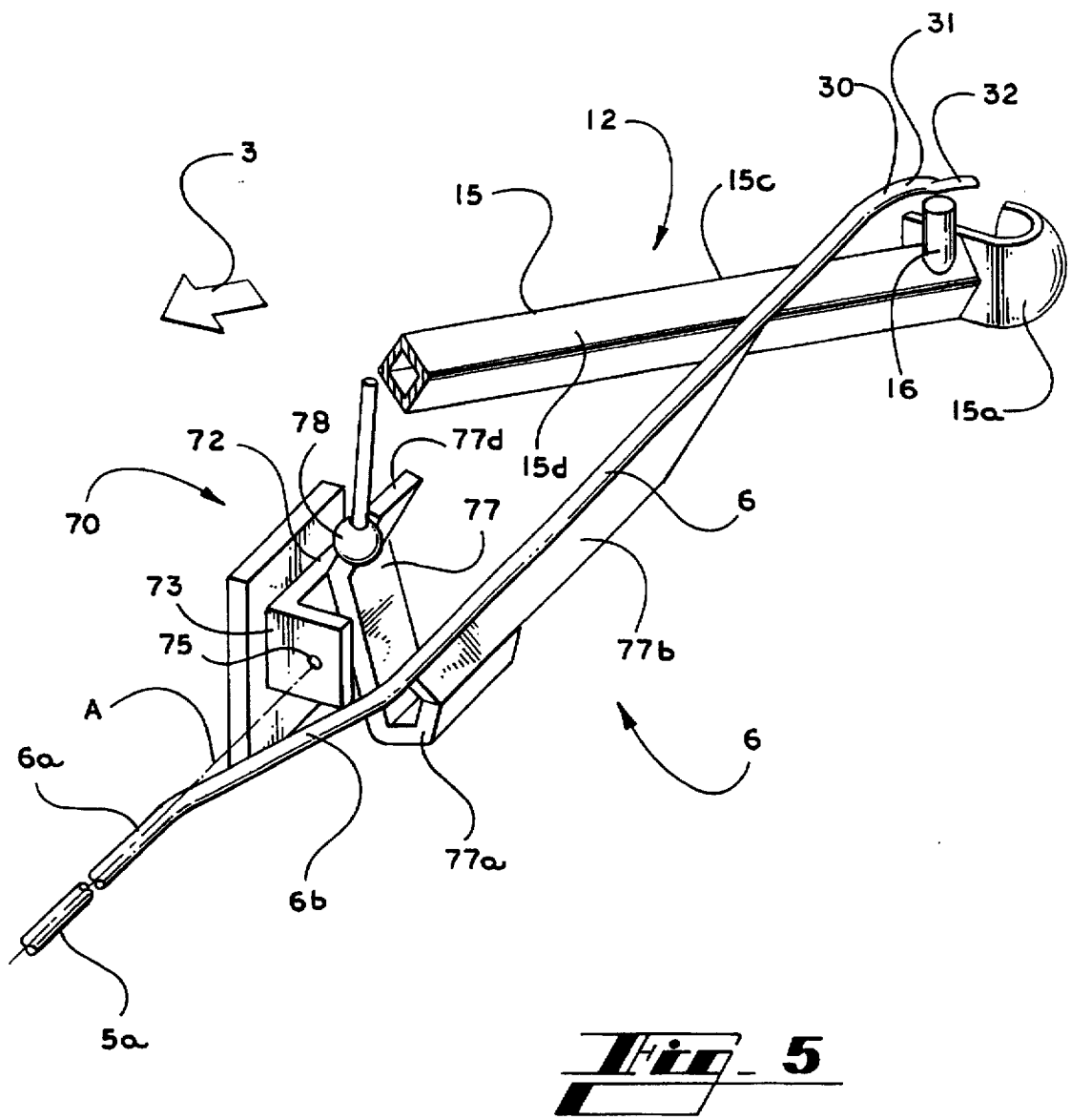
FIG. 5: a side view of the arrangement illustrated in FIG. 4, whereby the transfer device is pivoted into its standby position.

The transport direction of the trolley 12, of which only the carrying rod region is shown in FIGS. 4–7, is indicated by the arrow 3. The trolley 12 is situated at the transfer station of the transfer device 6. The transfer device 6 is constructed as an extension of the discharging rod and/or the discharging rod end 5a shown in FIG. 5, whereby said extension is situated on the side of the distribution track. The transfer device 6 has a linear section 6a which ends flush with the discharging rod 5a, a short linear section 6b that is bent laterally off this linear section 6a, a longer linear central section 6c situated adjacent to the bent section 6b and ends in a curved finger 30. The central rod section 6c extends parallel to the rod section 6a situated at the site of discharging rod and/or parallel to the discharging rod 5a. This means that the central rod section extends parallel to the collective central longitudinal axis A of the component 6a and 5a as well as laterally offset to the axis A. The central section 6c of the transfer device 6 extends slanted to the carrying rod 15 of the trolley 12 at an angle α shown in FIG. 7 as well as slanted so that it descends towards the rear originating from the trolley 12 as shown in FIGS. 4 and 5.

The transfer device 6 is arranged in such a way that it may be pivoted around the axis A. For this purpose, a pivot bearing 70 is provided, the pivoting axis of which is aligned with the axis A. The pivot bearing 70 is situated in an extension of the linear transfer rod section 6a at the elevation of the end of the linear rod section 6c which transforms into the transfer section 6b. The bearing 70 comprises a stationary plate 71 on which the basis of a U-shaped bearing element 72 is, e.g., by welding, fastened and aligned in such a way that the two limbs 73 and 74 of the bearing element 72 point toward the central transfer rod section, and that each of said limbs is penetrated centrally by the axis A. A shaft 75 is inserted rigidly into the bores of the limbs 73 and 74 which are aligned with the axis A. On the shaft 75 a rotatable bushing 76 is situated with which an L-shaped connecting angle 77 is connected, e.g., by means of welding. The lower end 77a of the connecting element 77 which acts as a lever is bent upward approximately in the shape of a U and is connected rigidly with a metal tab 77b and/or is constructed in one piece with the aforementioned tab 77b which extends parallel to the central transfer rod section 6c and is connected rigidly with the same, e.g., by means of welding. At the upper end, the L-shaped connecting element 77 is bent at a flat angle in the direction toward the tab 77b.

The ball of a ball joint 78 is arranged rigidly on the side of this bent end section 77d, namely similarly to the ball joint 42 illustrated in FIG. 2. The ball joint 78 is connected rigidly with the piston rod 79 of a piston/cylinder arrangement as shown in FIG. 2. The linear stroke movement of the piston rod 79 is transferred onto the connecting element 77 due to the coupling of the piston rod 79 via the ball joint 78, so that the central transfer rod section 6c carries out a pivoting movement along a cylindrcal path, the central longitudinal axis of which is the axis A.

Due to this pivoting movement, the finger 30 which is constructed as a one-piece extension of the transfer rod section 6c is pivoted between the position illustrated in FIG. 5 in which it is situated far from the trolley rod and a position in which the finger 30 adjoins the upper side wall 15d of the trolley carrying rod 15 (see FIGS. 4, 6 and 7).

Adjacent to its central transfer rod section 6c, the finger 30 consists of a bent section 31 a as well as an adjacent tip section 32a which protrudes upward and downward from the bent section 31 in the shape of a neb. The end region of the neb and/or the finger tip section 32a situated opposite the trolley rod 15 is flattened in the same fashion as a curved section 31a situated adjacent to it. The collective smooth surface of the finger tip region formed in this way adjoins the upper lateral carrying rod surface 15d which descends laterally in a slanted fashion two-dimensionally if the transfer device 6 assumes its pivoting position in which the finger 30 adjoins the trolley rod 15. Due to the fact that the neb 32a is laterally offset to the rotation axis A, said neb is pivoted eccentrically when rotating the rod-shaped transfer device 6.

FIG. 6 shows that the neb 32a is laterally offset from the finger 30 and has a lateral recess that is arranged in such a way that the neb may laterally travel past the spring 16 at a distance in its position shown in FIG. 7.

The removal and transfer of the material which is suspended on the trolley rods 15 via the coat hangers 20 is carried out by pivoting the neb end of the transfer rod 6 so that it adjoins the upper lateral surface 15d of the trolley carrying rod 15, as shown in FIG. 6. During the continued movement of the trolley 15 in the direction of the arrow 3, the neb 32 engages underneath the four hooks 20 which are situated on the bent finger section 31 which is bent in such a way that it forms an ascending ramp for the hooks 20 which extends at an angle to the carrying rod surface 15d, so that the hooks 20 moving over the ramp are not only lifted due to the ensuing hooks and the relative movement between the trolley rod 15 and the neb 32, but also offset laterally in their position to the carrying rod 15 such that they are released entirely from the carrying rod 15 and pushed over the apex of the finger curvature onto the descending rod section 6c by the ensuing hooks from where it slides onto the discharging rod 5 via the rod sections 6b and 6a. As soon as the rear hook 20 viewed in the moving direction comes into contact with the spring 16 of the carrying rod holding means due to the fact that the trolley 12 in the meantime has continued its movement in the direction of the arrow 3, the rear hook also is pushed onto the bent section 31 of the finger 30 which forms a ramp together with the hook that is situated in front of the rear hook and has not yet been released from the carrying rod 12, whereby at least the front hook 20 is already released from the upper longitudinal edge 15c of the carrying rod 15 since the apex of the arc and/or the apex of the finger curvature lies at a higher elevation than the longitudinal edge 15c. As soon as the neb 32 assumes its position from which it is situated laterally from the spring 16 as shown in FIG. 7, the last hook 20, which is situated directly in front of the spring, is pushed onto the ramp section 31 and released from the upper edge 15c of the carrying rod 15 no later than the time at which the transfer rod 6 starts its pivoting movement in the direction toward its position in which it is situated far from the trolley rod as illustrated in FIG. 5 and as soon as the finger tip lies above the apex of the finger curvature. During this pivoting movement, the free end of the neb 32a is lifted above the apex of the curved finger section 31a such that the last hook 20 is also released entirely from the carrying rod 15 and slides downward onto the discharging rod 5 via the descending transfer rod 6 without being driven.

Due to the fact that a pivoting movement is carried out in both embodiments described previously once the last coat hanger has been taken hold of, the finger tip and/or the tip of the neb is moved into a position which is situated at a higher elevation than the highest point of the ramp curvature, so that the last hook may slide off without being obstructed. The leading hooks are pushed onto the ramp by the ensuing hooks. The only problems in the known devices are caused by the last hook since the suspension device, e.g., in the form of the spring 16, obstructs the entire process and interfere with the process of taking hold of the last hook. The invention solves this problem by means of the special shape of the finger and/or neb which facilitates that the finger may remain on the transport rod until the suspension device has reached the fingertip; in the instance of a neb, the suspension device may even extend beyond the tip of the neb by a certain distance. The time required for the downward pivoting movement which causes the last hook to slide off automatically due to the slanted surface formed by the tip of the finger and/or the neb as well as the upward pivoting movement may be shortened by the storage device 60 which retains the first and the following hooks of the ensuing trolley of the continuously moving trolley train until the finger and/or the neb is pivoted against the carrying rod of the ensuing trolley. However, the downward pivoting movement is not only carried out so as to initiate the sliding movement of the last bar, but also to prevent the finger and/or the neb from coming in contact with the suspension device 16 and the coupling device 15a of the moving trolley train. Only once these devices have passed, the pivoting movement may be continued, and the hooks of the ensuing trolley must be retained and/or stored until this point since the outward pivoting requires a section of the carrying rod on which no hooks are situated. The invention solves these problems with surprisingly simple means, namely the particular shape of the finger and/or the neb as well as the pivoting of the transfer rod and the temporary retention of the hooks of the ensuing trolley.

What is claimed:

1. Suspension type conveyor for transporting material which hangs on a hook in a suspended fashion, in particular garments which hang on coat hangers, with trolleys (11–14) that are suspended on a rail (9, 10), transport the material along said rail and are provided with carrying rods (15) on which the hooks (20) are suspended, with at least one descending discharging rod (5) which borders with an upper end laterally on a moving path of the trolley carrying rods (15) and by means of which the material slides off under the influence of gravity, and with a transfer device (6) for transferring the material transported by the trolleys (11–14), whereby said transfer device comprises a transfer finger (30) which is arranged at the upper end (5a) of the discharging rod (5), and is moveable against the carrying rod (15) of the respective trolley which is situated in a transfer position such that it engages underneath the hook (20) and is provided with an ascending ramp section (35) in such a way that the hooks (20) which move over said ascending ramp section (35) are released from the carrying rods (15), characterized by the fact that the finger (30) is arranged on a connecting part (6a,6b,6c,31) of the discharging rod (5) which is rotatable around a longitudinal axis of the discharging rod, that said finger is curved in such a way that its finger tip (32) is rotatable between a material transfer position in which the finger tip is arranged such that it adjoins the trolley carrying rod (15) under an apex of the curvature and a material conveying position in which the finger tip is arranged in such a way that it is situated at a distance from the trolley carrying rod (15) above the curvature by rotating the connecting part (6a,6b,6c,31), and that a retaining device (60) which engages coat hangers on the trolley carrying rod (15) is provided by means of which the garments are kept away from the transfer position on the trolley carrying rods (15) until the finger is pivoted into the material transfer position at the trolley carrying rod (15).

2. Suspension type conveyor according to claim 1, characterized by the fact that the finger tip (32) moves along a path which ends above the apex of the finger curvature when pivoting the finger (30) from its material transfer position into the material conveying position.

3. Suspension type conveyor according to claim 1, characterized by the fact that the connecting part is a sleeve (31), which is arranged in a pivoting fashion on an end of the discharging rod (5) situated on a side of the trolley rod and carries the finger (30) on the side of the trolley rod.

4. Suspension type conveyor according to claim 3, characterized by the fact that the finger (30) is constructed in one piece with the sleeve (31).

5. Suspension type conveyor according to claim 3, characterized by the fact that the sleeve (31) and the finger (30) are essentially constructed in a cylindrical shape.

6. Suspension type conveyor according to claim 2, characterized by the fact that the tip (32) of the finger (30) is rounded.

7. Suspension type conveyor according to claim 3, characterized by the fact that the finger (30) is arranged laterally offset to a central longitudinal axis of the sleeve (31) in such a way that an outer contour line of the finger (30) extends in an extension of an outer surface of the cylindrical sleeve (31).

8. Suspension type conveyor according to claim 3, characterized by the fact that a linear drive (40,41) and a motion transformer (42,43) for transforming the linear stroke movement of the linear drive into a rotational movement is provided for rotating the sleeve (31).

9. Suspension type conveyor according to claim 8, characterized by the fact that the motion transformer consists of a joint, preferably a ball joint (42), which is connected to the sleeve (31) and the actuation element (41) of the linear drive (40,41).

10. Suspension type conveyor according to claim 8, characterized by the fact that the linear drive is a hydraulically actuated cylinder/piston arrangement (40,41).

11. Suspension type conveyor according to claim 1, characterized by the fact that the rotatable connecting part is a bent rod (6) which has a linear section (6a) that is aligned with the discharging rod (5,5a) on a side of the discharging rod, a central section (6c) which extends laterally offset to the section (6a) on the side of the discharging rod and connected to a pivot drive (70), a pivoting axis (A) of which is aligned with a linear section (6a) on the side of the discharging rod and transforms into the finger (30) at the side of the trolley rod.

12. Suspension type conveyor according to claim 11, characterized by the fact that the transfer rod (6) and the finger (30) are constructed in one piece.

13. Suspension type conveyor according to claim 12, characterized by the fact that the central rod section (6c) is constructed in a linear fashion and extends parallel to the pivoting axis.

14. Suspension type conveyor according to claim 11, characterized by the fact that the finger (30) has a surface section that is adapted to the surface contour of the trolley carrying rods (15) within the region of its tip (32).

15. Suspension type conveyor according to claim 1, characterized by the fact that the material retention device (60) comprises a pin (61a) which may be adjusted in a direction of the longitudinal axis of the pin and may be moved from an inoperative position laterally next to the moving path of the trolleys (12) situated in the transfer position into a position underneath this path in which the pin engages into the moving path of the hooks (20) while retaining the same.

16. Suspension type conveyor according to claim 15, characterized by the fact that the pin (61a) may be actuated hydraulically, e.g., by means of a cylinder/piston arrangement (61).

* * * * *